United States Patent [19]

Packard et al.

[11] Patent Number: 4,692,674
[45] Date of Patent: Sep. 8, 1987

[54] BRUSHLESS DC MOTOR CONTROL SYSTEM RESPONSIVE TO CONTROL SIGNALS GENERATED BY A COMPUTER OR THE LIKE

[75] Inventors: Douglas T. Packard, La Canada; Donald E. Schmitt, San Jose, both of Calif.

[73] Assignee: The United States of America as represented by the Administrator of the National Aeronautics and Space Administration, Washington, D.C.

[21] Appl. No.: 727,838
[22] Filed: Apr. 26, 1985
[51] Int. Cl.$^4$ .............................................. H02P 6/02
[52] U.S. Cl. .................................. 318/254; 318/138; 318/696
[58] Field of Search ............... 318/138, 254, 439, 696, 318/599

[56] References Cited

U.S. PATENT DOCUMENTS

| | | | |
|---|---|---|---|
| 3,345,547 | 10/1967 | Dunne | 318/138 |
| 3,378,739 | 4/1968 | Livengood et al. | 318/18 |
| 3,378,741 | 4/1968 | Sutton | 318/18 |
| 3,465,217 | 9/1969 | Kress | 318/18 |
| 3,466,520 | 9/1969 | Aylikci et al. | 318/138 |
| 3,514,680 | 5/1970 | Williams | 318/138 |
| 3,622,703 | 11/1971 | Ricketts et al. | 178/69.5 |
| 3,706,923 | 12/1972 | Dunfield | 318/254 |
| 3,760,252 | 9/1973 | Beery | 318/611 |
| 3,769,555 | 10/1973 | Dolbachian et al. | 318/138 |
| 3,803,464 | 4/1974 | Kuroyangai | 318/85 |
| 3,806,789 | 4/1974 | Cap et al. | 318/640 |
| 3,863,118 | 6/1975 | Lander et al. | 318/685 |
| 3,896,349 | 7/1975 | Lozenko et al. | 318/85 |
| 4,011,487 | 3/1977 | Loomis | 318/138 |
| 4,066,945 | 6/1978 | Korte | 318/681 |
| 4,103,216 | 7/1978 | Hayes | 318/685 |
| 4,107,594 | 8/1978 | Jacobs | 318/685 |
| 4,146,801 | 3/1979 | Vali et al. | 307/254 |
| 4,162,435 | 7/1979 | Wright | 318/254 |
| 4,238,717 | 12/1980 | Knight et al. | 318/341 |
| 4,249,116 | 2/1981 | Hieda | 318/254 |
| 4,250,435 | 2/1981 | Alley et al. | 318/138 |
| 4,270,074 | 5/1981 | Duckworth et al. | 318/254 |
| 4,275,340 | 6/1981 | Schlenpen | 318/280 |
| 4,287,458 | 9/1981 | Nakamura et al. | 318/341 |
| 4,319,171 | 3/1982 | Motoori | 318/379 |
| 4,337,423 | 6/1982 | Giordano | 318/280 |
| 4,360,769 | 11/1982 | Selkey et al. | 318/601 |
| 4,368,411 | 1/1983 | Kidd | 318/254 |
| 4,400,654 | 8/1983 | Elliott | 318/312 |
| 4,422,027 | 12/1983 | Mohlere | 318/687 |
| 4,434,389 | 2/1984 | Langley et al. | 318/254 |
| 4,447,768 | 5/1984 | Terui | 318/293 |
| 4,449,079 | 5/1984 | Erdman | 318/254 |
| 4,454,458 | 6/1984 | Holland | 318/254 |
| 4,473,786 | 9/1984 | Miyashita et al. | 318/561 |

FOREIGN PATENT DOCUMENTS

| | | | |
|---|---|---|---|
| 55-155592 | 12/1980 | Japan | 318/254 |
| 1597790 | 9/1981 | United Kingdom | 318/254 |

Primary Examiner—William M. Shoop, Jr.
Assistant Examiner—Bentsu Ro
Attorney, Agent, or Firm—Paul F. McCaul; John R. Manning; Thomas H. Jones

[57] ABSTRACT

A control system for a brushless DC motor responsive to digital control signals is disclosed. The motor includes a multiphase wound stator and a permanent magnet rotor. The rotor is arranged so that each phase winding, when energized from a DC source, will drive the rotor through a predetermined angular position or step. A commutation signal generator responsive to the shaft position provides a commutation signal for each winding. A programmable control signal generator such as a computer or microprocessor produces individual digital control signals for each phase winding. The control signals and commutation signals associated with each winding are applied to an AND gate for that phase winding. Each gate controls a switch connected in series with the associated phase winding and the DC source so that each phase winding is energized only when the commutation signal and the control signal associated with that phase winding are present. The motor shaft may be advanced one step at a time to a desired position by applying a predetermined number of control signals in the proper sequence to the AND gates and the torque generated by the motor may be regulated by applying a separate control signal to each AND gate which is pulse width modulated to control the total time that each switch connects its associated winding to the DC source during each commutation period.

27 Claims, 16 Drawing Figures

BRUSHLESS DC MOTOR CONTROL SYSTEM RESPONSIVE TO CONTROL SIGNALS GENERATED BY A COMPUTER OR THE LIKE

BACKGROUND OF THE INVENTION

1. Origin of the Invention

The invention described herein was made in the performance of work under a NASA Contract and is subject to the provisions of Section 305 of the National Aeronautics and Space Act of 1958, Public Law 85-568 (72 STAT 435; 43 USC 2457).

2. Field of the Invention

This invention relates to direct current (DC) motor control systems, and more particularly to systems for controlling brushless DC motors in response to digital control signals generated by a microprocessor, computer or the like.

3. Brief Description of the Prior Art

Computers and microprocessors have found widespread use in control systems. Such control systems often utilize electric motors, e.g., of the DC brush or brushless type, to perform a variety of tasks such as positioning members, e.g., antennas, solar arrays, etc. However, conventional motors require extensive additional electronic circuitry in order to interface with the computers or microprocessors. The additional electronics may include a power module for translating feedback signals of servo modules, tachometers, shaft encoders, feedback summing boxes and potentiometers for providing appropriate shaft position, speed, etc. The use of such components to translate the digital signals from the microprocessor into the voltages and currents is necessary to drive the motors and increases the complexity, cost, size and weight of the control system.

In addition to adding to cost, etc., the control system designers often have to design the circuitry internal to many such components to provide the desired motor performance. Where the rate or speed at which the motor shaft advances from one position to another must be controlled, the designer will generally have to make a tedious selection from available shaft position sensors such as tachometers, encoders, etc., to achieve the best match since the manufacturers of the motor and shaft position sensors seldom design one component specifically for the other. Very often a compromise is the best that the designer can accomplish. These accessory components needed to interface a source (composite) of low level digital signals with electric motors also add undesired inertia and friction to the systems. The inertia and resistance of these accessory items may exceed that of the load desired to be driven.

U.S. Pat. No. 4,249,116 advocates the use of a programmable oscillator as an interface between a brushless DC motor and a computer to provide some measure of torque and speed control. However, the control system disclosed in the U.S. Pat. No. 4,249,116 is not only complex, but unsuitable for incremental position (stepping) control or for rate (speed) and torque control during transitions, i.e., between zero and the desired rate.

Incremental position control has been achieved by stepper motors and their associated digital controls. While such motors and their controls are reasonably simple and reliable, they raise other problems, such as increased power requirements, slow speed operation and low torque sensitivity. The present invention solves the above problems by providing a DC brushless electric motor and control system which is responsive to low power level digital control signals from a computer or microprocessor to cause the motor to step to a desired position or run continuously at a controlled rate and torque, reverse direction and synchronize itself with other motors.

SUMMARY OF THE INVENTION

In accordance with the present invention, a DC brushless motor and control system adapted to be energized from a source of direct current and controlled in response to digital signal from a function generator, such as a computer or microprocessor, is provided. The motor includes a shaft carrying a permanent magnet rotor and a multiphase wound stator. The rotor and stator are arranged so that each phase winding when energized (during its commutation period) from the DC source causes the rotor to step or advance through a predetermined angular position. Shaft position-sensing means are provided to derive shaft position signals indicative of the angular position of the motor shaft.

A commutation signal generator is responsive to the shaft position signals for generating commutation signals representative of the commutation period for each phase winding of the motor. Driving means which may, for example, be in the form of semiconductor switches are individually associated with each phase winding for selectively applying current from the DC source to the associated winding. Gating means, which may conveniently be in the form of AND gates, are individually connected to the driving means for each phase winding. Each gating means is responsive to the commutation and digital control signals (from the computer) for the respective phase winding for enabling the associated driving means to apply current to the respective winding only upon the occurrence of the commutation signal and the control signal for the winding.

The motor may be incrementally advanced to any selected position, as determined by the control signals applied to the gating means to set the number of times that each phase winding is connected to the DC source, or the motor may be run continuously. The rate at which the motor steps or advances from one position to another may be controlled by varying the repetition rate of the control signals (step command pulses) applied to the gating means. In addition to controlling the rate at which the motor advances from one position to another, the computer may be programmed to apply a plurality of torque-regulating pulses to the gating means during each commutation period. The torque-regulating pulses control the total time duration in which each driving means applies current from the DC source to the associated winding during each commutation period.

The novel features of the invention are set forth with particularity in the appended claims. The invention may be best understood from the following description when read in conjunction with the accompanying drawings.

DETAILED DESCRIPTION OF THE DRAWINGS

Figure 1:
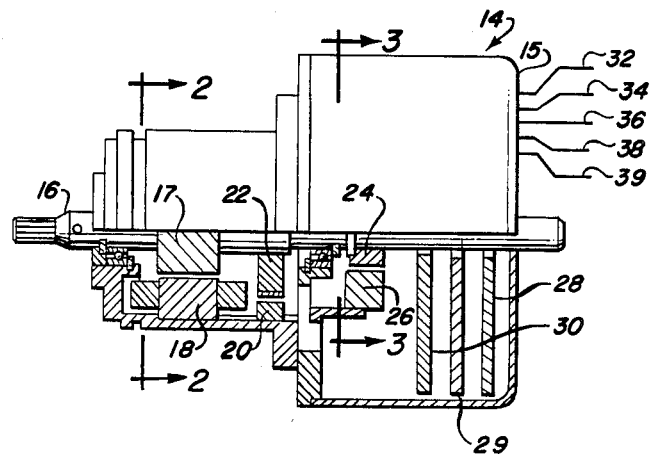
FIG. 1 is an elevational view, partially broken away, of a prior art brushless DC motor and a control circuit therefore.

Referring now to the drawings, in which the same numerals are used in the several figures to identify the same element, and particularly to FIG. 1, there is illustrated a prior art three-phase brushless DC motor 14 which includes a case 15, a shaft 16, a rotor 17 and a stator 18. The motor includes a magnetic detent assembly comprising a stationary portion 20 and a rotating portion 22. The magnetic detent assembly is conventional and includes a plurality of small permanent magnets spaced at 10-degree increments around the shaft to stop the motor at one of the 10° positions and prevent a load connected to the shaft (through gearing) from causing the motor to reverse.

Figure 3:
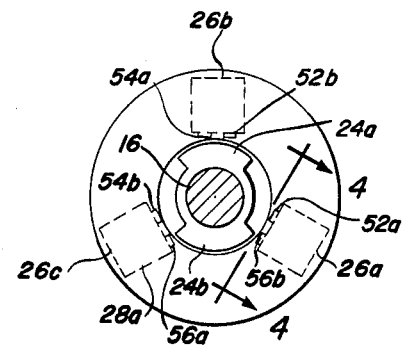
FIG. 3 is a cross-sectional view taken along lines 3—3 of FIG. 2 of a rotor position sensor incorporated in the motor of FIG. 1.

The motor includes a rotor or shaft position sensor in the form of a rotating target 24 connected to the shaft 16 and three stationary permanent magnets 26, as is shown more clearly in FIG. 3. Three printed circuit boards 28, 29 and 30 are mounted in the housing 12 and contain the control electronics to permit the motor to operate as a brushless DC motor. Power input leads 32 and 34 extend from the case 15 for connection through a suitable electronic power module to a source of DC voltage.

Lead 36 is connected to the case ground. Leads 38 and 39 are connected across a small resistor in series with the neutral leg of the motor windings to provide a voltage proportional to the current drawn by the motor, as will be explained in connection with FIG. 5.

Figure 2:
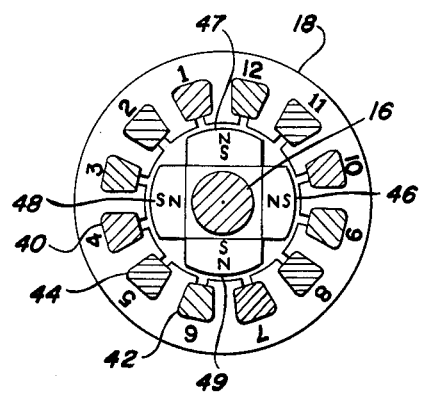
FIG. 2 is a cross-sectional view of the motor of FIG. 1 taken along lines 2—2.

Referring now to FIG. 2, the stator 18 includes 12 winding slots (numbered 1 through 12) to provide a full coil configuration and a directional change in current at each 90° of angular position. The winding for phase 1 is identified by the numeral 40 and is located in slots 1, 10, 4 and 7. Winding 42 for phase 2 is located in slots 3, 6, 9 and 12, and winding 44 for phase 3 is located in slots 2, 5, 8 and 11.

Four permanent magnets 46, 47, 48 and 49 are mounted on the shaft and oriented at 90° with alternating north and south poles, as shown. This permits the magnetic flux from the rotor to couple to the stator coil at four positions around the stator. The rotor magnets are sized to cover a 60° span or step at each of the 90° positions of the shaft. With this arrangement, one set of stator coils (one phase winding) will generate magnetic torque for 60° of shaft rotation. Each set of stator coils is displaced from the other sets by 60° around the stator circumference, as illustrated. With phase sequence control of the current to the stator coils, each phase will generate torque for 60° of shaft rotation, and the three phases will provide torque generation corresponding to 180° shaft rotation. The phase sequence is repeated for a full 360° of shaft rotation or one complete revolution. A commutation signal must be provided for each 60° of shaft rotation, and the signal must be in proper phase sequence to provide a continuous rotating current in the stator windings and the necessary rotating field.

FIG. 3 illustrates an end view of the rotor or shaft position sensor. The sensor includes a target 24 carried by the shaft 16, which is made of a ferromagnetic material such as soft iron with a pair of lobes 24a and 24b. The stationary portion 26 of the rotor position sensor includes three permanent magnets 26a, 26b and 26c spaced around the rotor shaft at 120° positions, as illustrated. A pair of magneto resistors are carried on the face of each of the permanent magnets 26a–26c adjacent the target 24. As is illustrated in FIGS. 3 and 4, magneto resistors 52a and 52b are mounted on the face of magnets 26a and 26b; magneto resistors 54a and 54b are mounted on the face of magnets 26b and 26c; and magneto resistors 56a and 56b are mounted on the face of magnets 26c and 26a, as shown.

Figure 4:
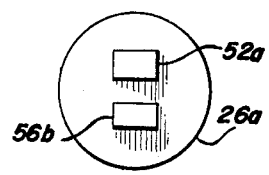
FIG. 4 is an end view taken along lines 4—4 of FIG. 3 of one of the magnets of the rotor position sensor with the magneto resistors secured to the face thereof.

Referring now to FIG. 4, there is illustrated the manner in which the magneto resistors 52a and 56b are mounted on the face of the permanent magnet 26a. The magneto resistors are semiconductor elements that provide an increase in resistance when they are exposed to an increased magnetic flux. The proximity of the rotor target 24 to each magneto resistor governs its relative resistance. The magneto resistors are connected to form the legs of a bridge network, as is illustrated more particularly in FIG. 5, so that as the target rotates a shaft position signal is generated which is indicative of the shaft position.

Figure 5:
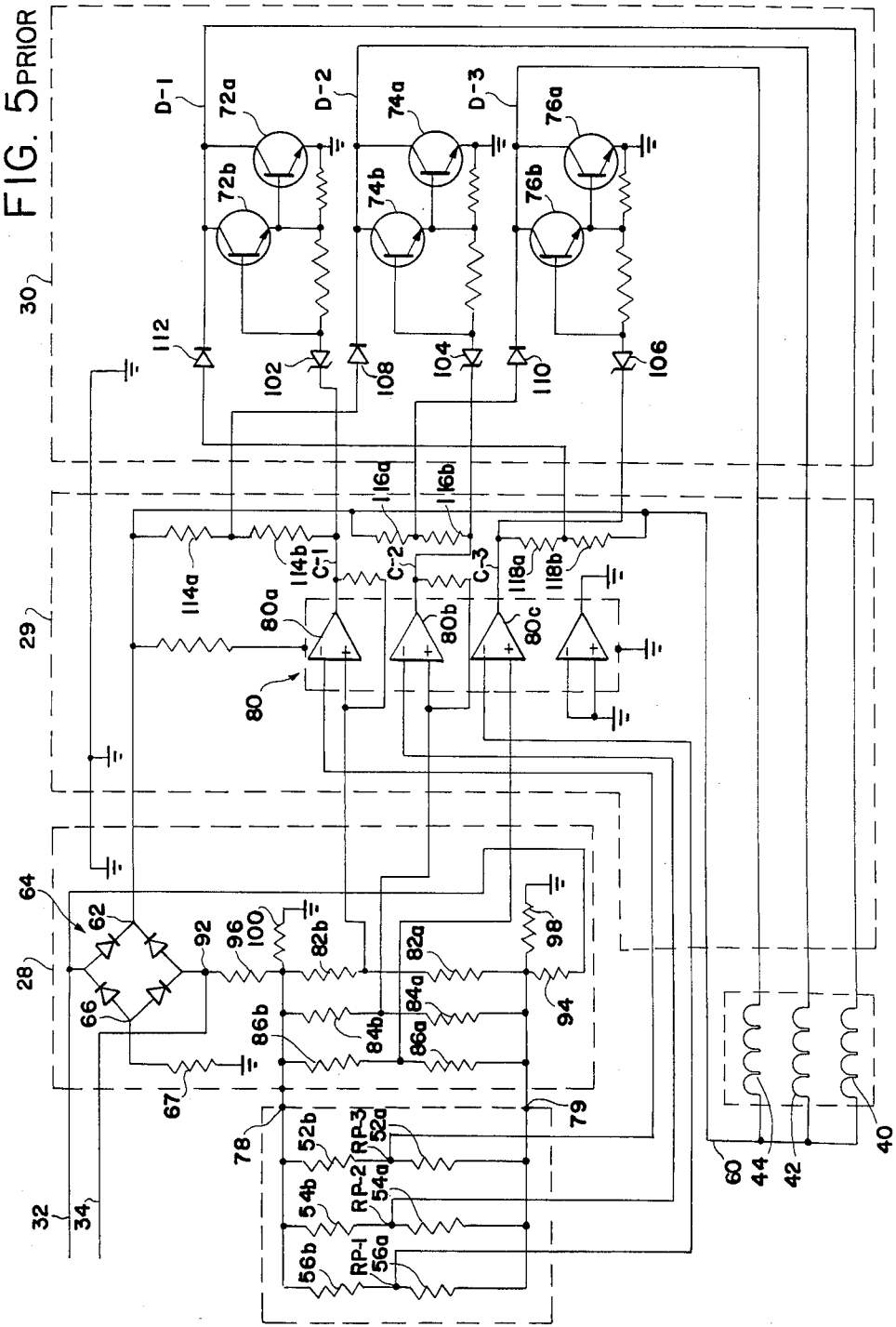
FIG. 5 is a schematic circuit diagram of the electronic control circuit incorporated in the motor of FIG. 1.

Referring now to FIG. 5, there is illustrated the control electronics for the motor of FIGS. 1 through 4. The phase windings 40, 42 and 44 of the motor are connected in a star configuration, as shown, with a neutral leg 60 connected to the junction of the three windings. The neutral leg 60 is connected to an output terminal 62 of a full wave rectifier bridge 64. The other output terminal 66 of the bridge 64 is connected to ground through an armature current sensing resistor 67. A suitable source of DC power is applied to the input of the bridge 64 by means of power input leads 32 and 34.

Darlington configuration switching transistors 72a/72b, 74a/74b and 76a/76b are individually connected in series with each phase winding for selectively applying current to the associated winding from the power source connected to the terminals 32 and 34, as will be explained. Each pair of switching transistors is sometimes hereinafter referred to as driving means for selectively applying current to associated phase winding of the motor. The driving means for the phase 1 winding comprises transistors 72a and 72b with a pair of resistors connected between the emitter and base electrodes of each transistor, as illustrated. Transistors 74a and 74b comprise the driving means for the second phase winding, and transistors 76a and 76b comprise the driving means for the third phase winding. Leads D1, D2 and D3 connect the phase windings 40, 42 and 44 to the collector electrodes of the transistors 72a, 74a and 76a, respectively.

Separate pairs of the shaft position sensor elements (magneto resistors) 52a through 56b are connected in series between terminals 78 and 79, as illustrated, with the junctions RP-1, RP-2 and RP-3 of each pair connected to separate negative inputs of a comparator 80. The comparator 80 includes three high gain operational amplifiers 80a, 80b and 80c, and an additional operational amplifier which is not used. A reference voltage is applied to the positive input to each of the operational amplifiers 80a, 80b and 80c by means of the resistors 82a–86b. The positive input to the amplifier 80a is connected to the junction of resistors 82a and 82b. The positive input of the amplifier 80b is connected to the junction of resistors 84a and 84b, and the positive input to the amplifier 80c is connected to the junction of resistors 86a and 86b. Each pair of resistors 82a/82b, 84a/84b and 86a/86b is connected in parallel with the pairs of shaft position sensor elements 52a/52b, etc., to form three separate bridge circuits.

The terminals 78 and 79 of the bridge circuits are connected to the input power terminals 32 and 34 through resistors 94 and 96, as shown. A pair of additional resistors 98 and 100 connects the terminals 78 and 79 to ground, respectively.

The target 24 (carried by the rotor) changes the resistance of the shaft position sensor elements 52a through 56b as the shaft rotates. As a result, the voltages (in the millivolt range) at terminals RP-1, RP-2 and RP-3, representing the shaft position, change, and this change are compared with the reference voltages across the balanced legs of the bridges (resistors 82a–86b) by the comparator 80. The output signal on output terminals C-1, C-2 and C-3 of the amplifier 80a–80c provides a three-phase commutation signal for driving the transistors 72a–76b in proper sequence to provide a rotating field in the stator. Any overlap of these output signals due to the target configuration of the shaft position sensor (thereby providing overlapping commutation signals) is prevented by feedback from the driving transistors, as will be explained.

The output signals on terminals C-1, C-2 and C-3 of the comparator 80 are applied across the base emitter junctions of transistors 72b, 74b and 76b through sensor diodes 102, 104 and 106 (to prevent premature turn-on of the transistor), as shown.

Cross-strapping diodes 108, 110 and 112 are connected between the collectors of the switching transistors 72a, 74a and 76a, and the output terminals C-1, C-2 and C-3 of the comparator 80, as illustrated, to ensure that (1) only one pair of Darlington transistors will be switched on at any time; and (2) the commutation signals from the comparator 80 are coextensive with the angular rotation of the shaft (e.g., 60°) resulting from the energization of the associated phase winding. This prevents the energization of more than one stator winding at a time. The diode 108 is connected to the junction of a pair of resistors 114a and 114b, which resistors are connected in series between the output terminal C-1 and the output terminal 62 of the diode bridge 64. The diodes 110 and 112 are in similar fashion connected to the junction of resistors 116a and 116b and 118a and 118b, respectively, with these transistors being connected between the terminal 62 and the output terminals C-2 and C-3, as shown.

Figure 6:
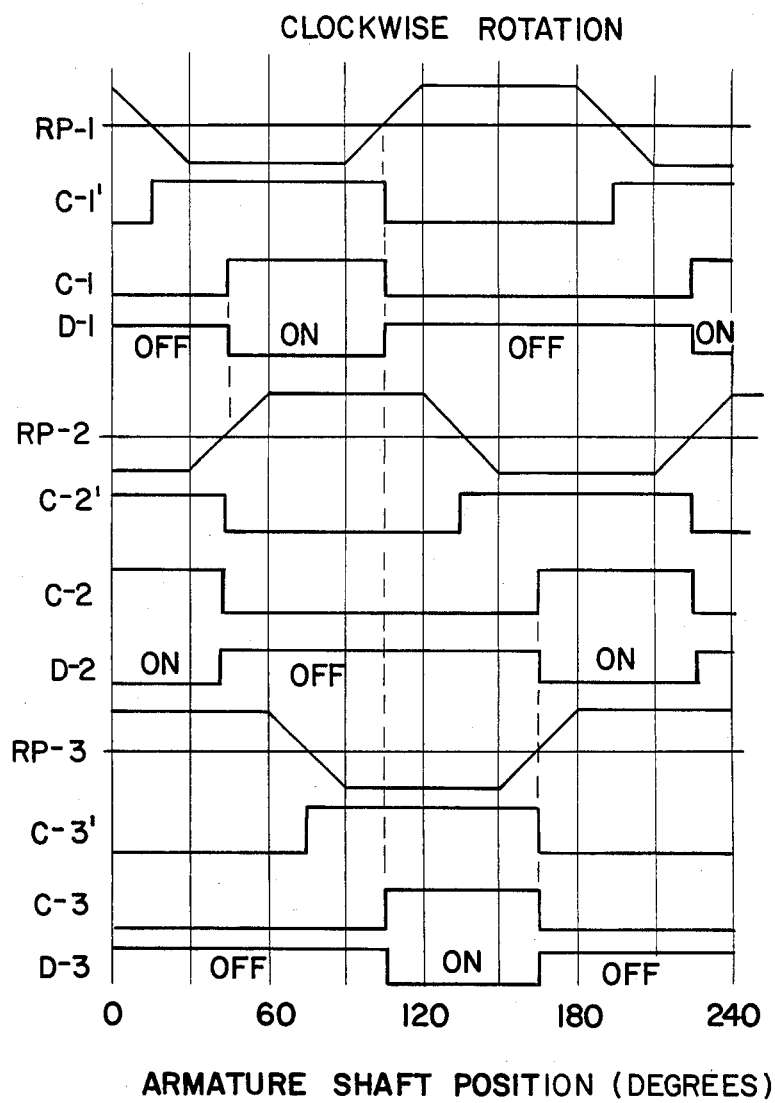
FIG. 6 is a waveform diagram illustrating the waveform of the pulses present at various points in the circuit of FIG. 5 for clockwise rotation of the motor shaft.

Referring now to FIG. 6, the waveforms RP-1, RP-2 and RP-3 represent the shaft position signals appearing on output leads RP-1, RP-2 and RP-3 of the circuit of FIG. 5. Each of the signals appearing at these leads completes one cycle during 180° of shaft rotation. The shaft position signals are displaced from each other by 60°, as in illustrated in FIG. 6. The voltage waveforms C-1', C-2' and C-3' (no diode clamping) represent the voltages that would appear on the output of the comparator terminals C-1, C-2 and C-3 absent the clamping action of the diodes 108, 110 and 112. The comparator 80 has a high gain and effectively converts the shaft position signals into square waves. The clamping diodes 108, 110 and 112 clamp each of the output terminals C-1, C-2 and C-3 of the comparator 80 to substantially ground points during the time that the preceding winding is energized. For example, diode 108 clamps the output terminal C-1 to substantially ground potential when the phase 2 winding is energized by transistor 74a, etc. Waveforms C-1, C-2 and C-3 in FIG. 6 (diode clamping) demonstrate the actual signals present at the respective output terminal with the diodes 108, 110 and 112 present. Waveforms D-1, D-2 and D-3 represent the voltage present across the driving transistors 72a, 74a and 76a, respectively, and hence the energization of the respective stator windings.

To reverse the direction of the motor, it is simply necessary to reverse the polarity of the DC input power applied to terminals 32 and 34. As will be noted, the diode bridge 64 maintains the same polarity across the driving transistors 72a–76b, and hence the same direction of current flow through the stator windings. Reversal of the polarity of the input power reverses the polarity across the shaft position sensor bridges or terminals 78 and 79. This results in a reversal of the signal phase input to the comparator, causing the driving transistors to effectively reverse the sequence of operation, thereby reversing the direction of the motor.

Figure 7:
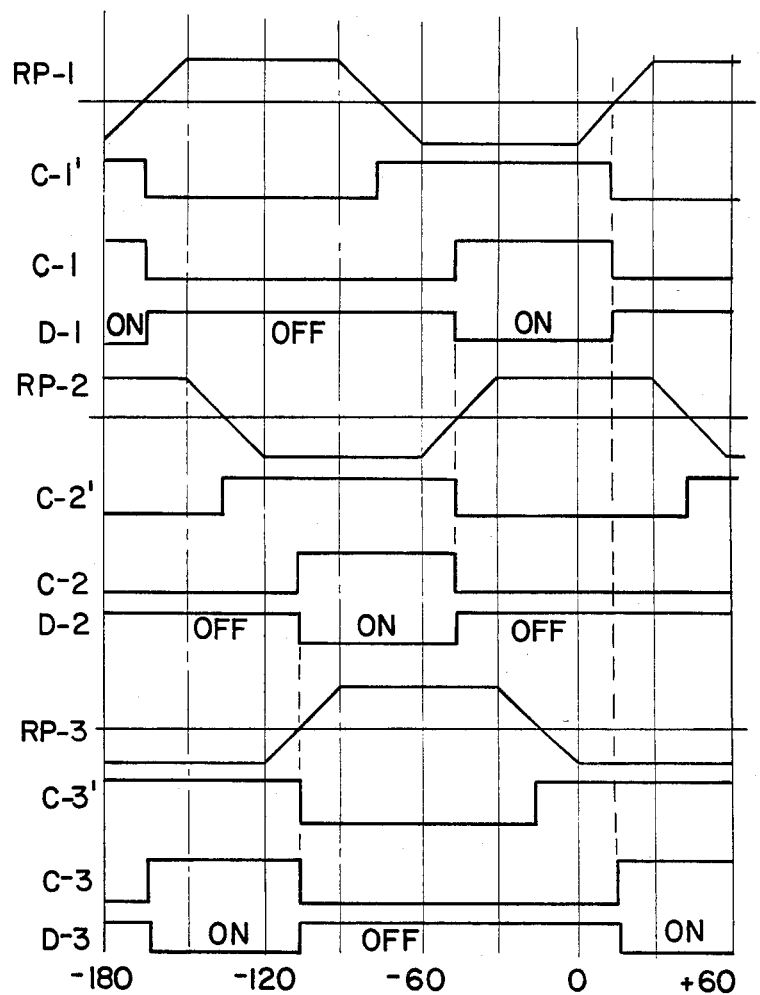
FIG. 7 is another waveform diagram illustrating the waveform of the pulses present at various points in the circuit of FIG. 5 during counterclockwise rotation of the motor shaft.

FIG. 7 illustrates the waveforms present in the circuit of FIG. 5 with the input power polarity reversed to provide a counterclockwise rotation of the motor. On an initial reversal of the input power, the motor's first step in the opposite direction will be through a 30° angle. From then on, the motor will step in 60° increments, as will become apparent from FIGS. 6 and 7.

The motor of FIGS. 1, 2 and 5 is manufactured by Aeroflex Laboratories of Plainview, N.Y. The motor is controlled by varying the amplitude and polarity of the supply voltage applied to terminals 32 and 34. As discussed previously, this requires that various control components, such as power control boxes, feedback summing boxes, etc., be matched as closely as possible to the motor. Such components and the necessity to match them to the characteristics of the motor are eliminated by the present invention.

Figure 8:
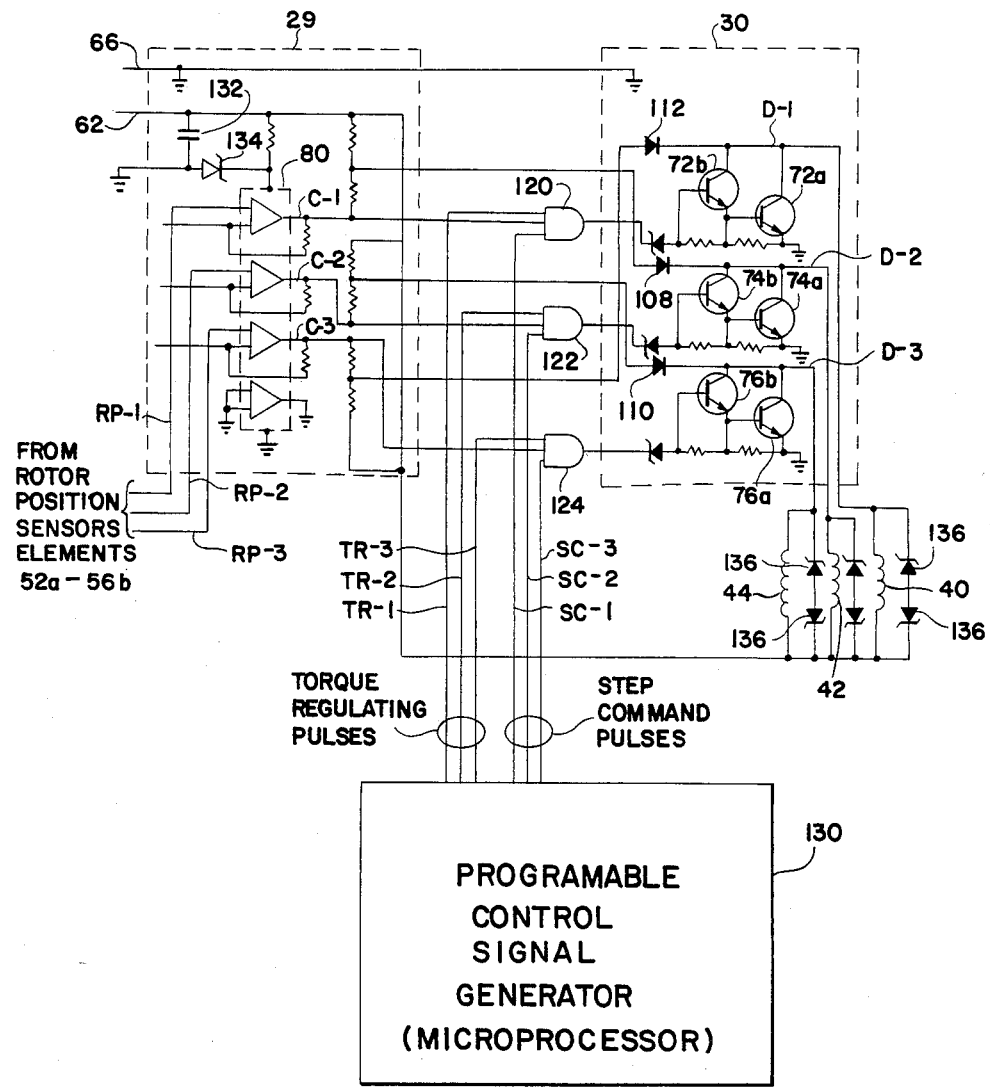
FIG. 8 is a schematic circuit diagram of an embodiment of a motor control system in accordance with the present invention with certain elements of the circuit of FIG. 5 left out for simplicity.

Referring now to FIG. 8, an embodiment of the present invention is illustrated for controlling the motor of FIGS. 1-4 in response to low level (e.g., 0-5 volts) digital signals from computers or microprocessors. It should be noted that many of the circuit elements of FIG. 5 are not included in FIG. 8 for sake of simplicity. In accordance with the invention, gating means in the form of AND gates 120, 122 and 124 are individually connected, as shown, between the output terminals of the comparator 80 and the input to the drive transistors for each phase winding. The AND gate 120 is connected between the output terminal C-1 of the comparator 80 and the input to the transistor 72b for phase winding No. 1. AND gate 122 is connected between the output terminal C-2 and the input to the transistor 74b for the second phase winding, and gate 124 is connected between the output terminal C-3 and the input to the transistor 76b.

Each of the AND gates receives the communication signal for the associated phase winding and input signals from a programmable control signal generator 130. The control signal generator 130 may be in the form of a computer or microprocessor which provides low-level digital signals for enabling the AND gates 120, 122 and 124 to incrementally position the motor 13 and control the torque generated therein as desired hereinafter. These control signals include step command pulses on leads SC-1, SC-2 and SC-3 and torque regulation pulses on leads TR-1, TR-2 and TR-3. The circuit of FIG. 8 includes, in addition to the elements of FIG. 5 (1) the AND gates 120, 122 and 124; (2) the control signal generator 130; (3) a voltage regulator consisting of a capacitor 132 (connected across the output of the diode bridge 64) and a zener diode 134 (connected between ground and the power supply terminal to the comparator 80); and (4) a pair of zener diodes 136 connected across each stator winding to suppress transient voltages.

The drive transistors associated with each of the AND gates 120-124 will turn on to thereby supply current to the respective stator winding only when all of the inputs to that AND gate are positive. Where incremental positioning of the motor only is desired, then AND gates 120, 122, and 124 can simply be provided with three inputs; that is, one input for receiving the commutation signals from the comparator 80, one input for receiving the step command pulses from the control generator 130 and one input for receiving the torque-regulating pulses from the control generator 130. With such an arrangement, the shaft of the motor will begin to rotate when all of the inputs to an AND gate become positive, and rotation will continue until the comparator 80 switches its high level output to the next stator coil or until the step command pulse input is terminated. Thus, failure to complete a step will not cause a torque dropout because as the sequential step command pulses continue, full motor torque will again be developed. By the same token, a long step command pulse can be used without danger of excessive power dissipation within the motor because the comparator input (commutation signal) to the gate will drop to zero as soon as 60° of shaft rotation occurs, thereby terminating the drive signal to that transistor pair, regardless of the status of the step command pulses. The motor may be stepped at any desired speed within the limits of the electrical time constant of the motor by simply adjusting the pulse repetition rate of the step command pulses. When the step command pulses become a continuous signal applied to all three AND gates, the motor will simply operate as a conventional brushless DC motor.

The amount of current supplied to the stator windings during the step command pulses determines the torque produced by the motor. By providing torque-regulating pulses from the signal control generator 80 on leads TR-1, TR-2 and TR-3 which have a controllable width (pulse width modulation), the magnitude of the current supplied to the stator windings during each commutation period can be regulated. The torque-regulating pulses must have a repetition rate which is higher than the repetition rate of the step command pulses. For example, the repetition rate of the torque-regulating pulses may be ten times the repetition rate of the step command pulses. The duty cycle of the torque-regulating pulses determines the total on time for each drive transistor pair and the total amount of energy applied to the load during each step. The current sensing resistor 67 of FIG. 5 may be used in a feedback circuit for permitting the torque profile of the motor to be tailored to any desired function within the limits of the motor, as will be explained more fully hereinafter.

It should be noted that the control system of this invention will operate brushless motors of two phases, three phases or more. Various types of shaft position sensors, drive transistors, etc., may also be used in place of the arrangement shown in FIGS. 1-5.

Figure 9:
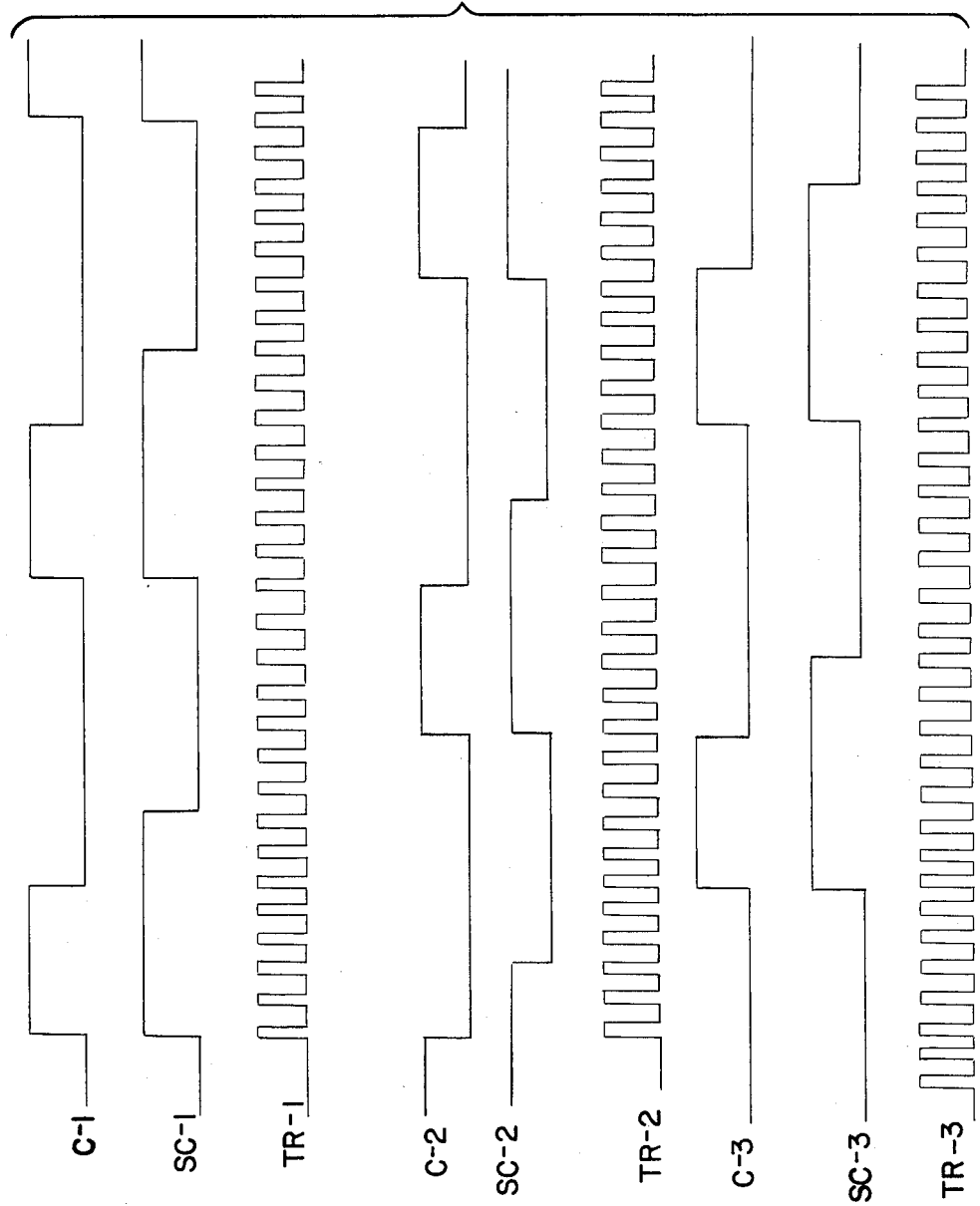
FIG. 9 is a waveform diagram illustrating the waveform of certain signals present in the circuit of FIG. 8.

Referring now to FIG. 9, there are illustrated the waveforms of certain of the signals present in the circuit of FIG. 8. The waveforms SC-1, SC-2 and SC-3 represent the waveforms of the step command pulses on leads SC-1, SC-2 and SC-3. The waveforms C-1, C-2 and C-3 represent the commutation signals from the comparator 80, as has been explained in connection with FIGS. 6 and 7. Waveforms D-1, D-2 and D-3 again represent the waveforms of the voltages appearing at the terminals D-1, D-2 and D-3. The waveforms TR-1, TR-2 and TR-3 represent the waveforms of the torque-regulating pulses on terminals TR-1, TR-2 and TR-3. It should be noted that a uniform pulse train to input commands (SC-1, SC-2 and SC-3) is not required. Incremental control of positioning can be achieved at any desired rate.

Figure 10:
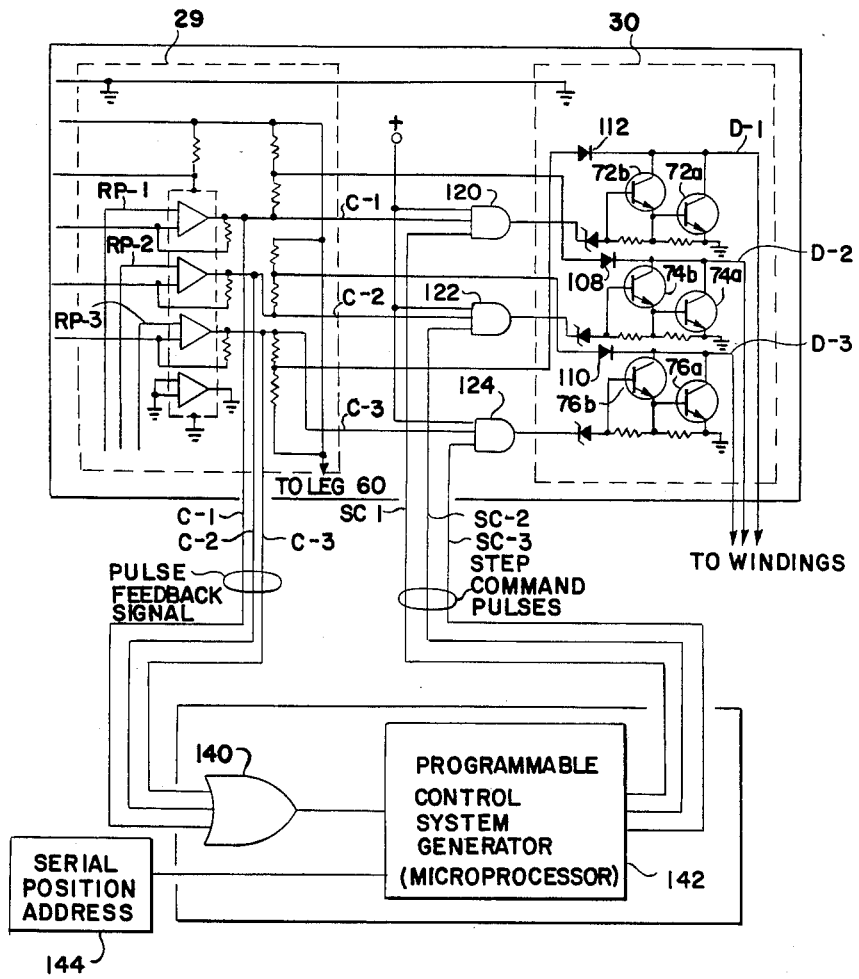
FIG. 10 is a combined block and schematic circuit diagram of another embodiment of the present invention for controlling the motor position.

Referring now to FIG. 10, there is illustrated a simplified system for controlling the position of the motor shaft. In this embodiment, the commutation signals on leads C-1, C-2 and C-3 are applied to the input of an OR gate 140, the output of which is applied to a programmable control signal generator 142, e.g., a microprocessor. The other input to the microprocessor is an address word from a serial position address generator 144. The output from the OR gate 140 will consist of six pulses for each revolution of the motor. The serial string of pulses from the OR gate 140 may be provided to a serial-to-parallel converter within the programmable control signal generator 142 to provide a binary word proportional to the number of pulses from the OR gate 140. The binary address word provided by the generator 144 is compared by the generator 142 to the binary word resulting from the output of the OR gate 140. If the binary address word is different than the binary word generated from the OR gate output, the generator 142 will supply step command pulses (similar to pulses SC-1, SC-2 and SC-3 of FIG. 9) to the AND gates 120, 122 and 124 to drive the motor. It should be noted that the third input to each AND gate 120, 122 and 124 is connected to a positive potential, as illustrated, so that the two remaining inputs control the output. The AND gates thus become effectively two-input gates.

When the binary word generated from the commutation signals equals the binary address word, the step command pulses to the motor will stop and the motor will be at the desired position. If the binary word generated from the commuitation signals is smaller than the address word, step command pulses with the proper sequence will be provided to the AND gates 120-124 to increase the generated binary word and vice versa. When the motor 14 is connected to the load through a set of gears having a high gear ratio, e.g., 880:1, the position of the load can be very accurately controlled, e.g., $2^{12}$ position increments per revolution.

Torque-regulating pulses from the generator 142 (e.g., microprocessor) can be provided on the third input to the AND gates for torque control, as discussed in connection with FIG. 8.

Figure 11:
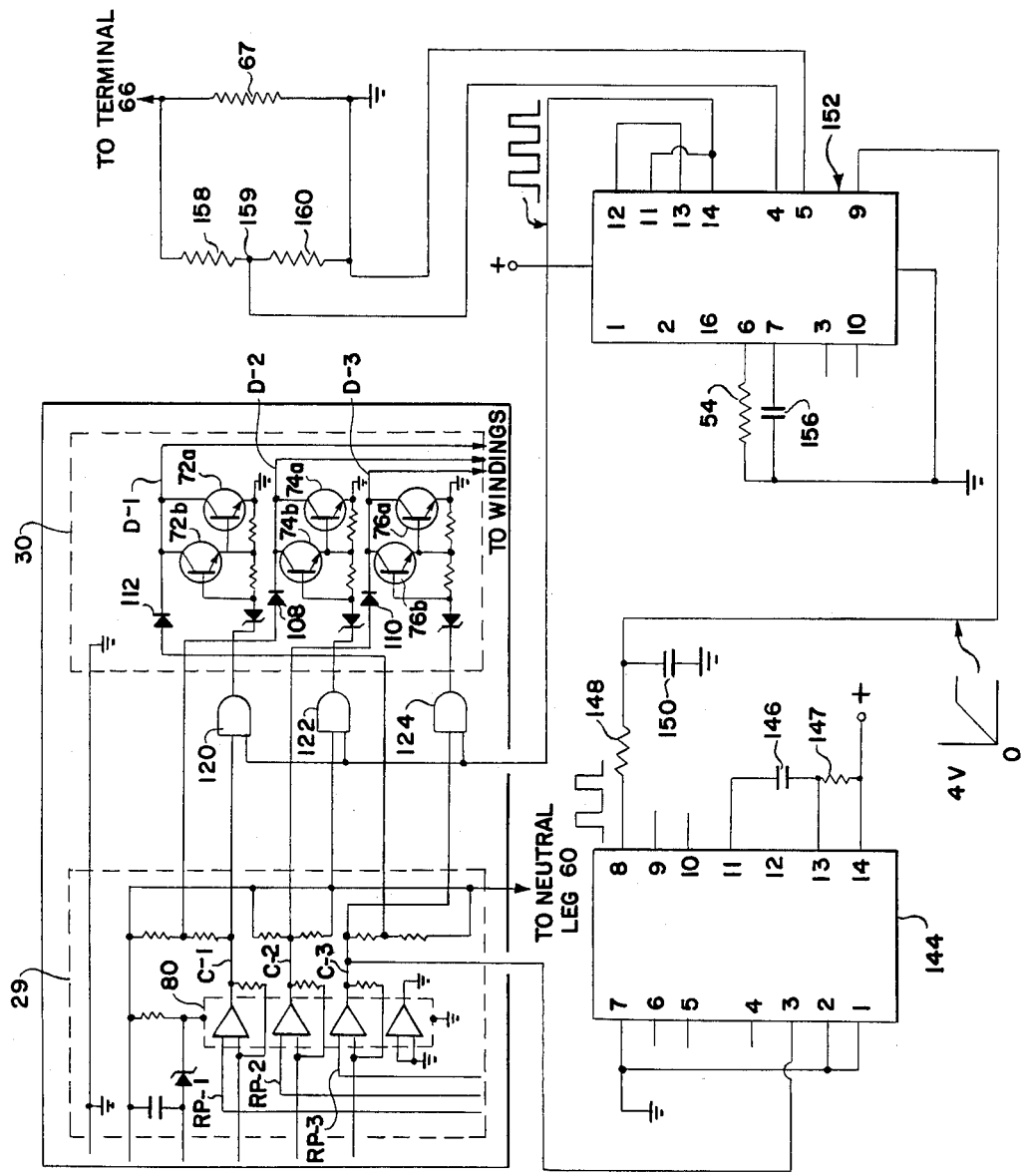
FIG. 11 is a schematic circuit diagram of another embodiment of the present invention for providing a desired torque profile for the motor.

FIG. 11 illustrates another embodiment of the present invention in which the torque profile of a continuously running motor is programmed to follow a linear curve. The commutation signal associated with one phase, in this case phase 3, is applied to a single retriggerable multivibrator 144. The multivibrator 144 may be of the type manufactured by a number of manufactures, including the National Semiconductor Corp., under Part No. 74122. The commutation signal is applied to terminal No. 3 of multivibrator 144, as shown. A timing capacitor 146 and a timing resistor 147 are connected to terminals 11, 13 and 14. The output signal on terminal 8 is a pulse initiated by the commutation signal and having a repetition rate determined by the frequency of the commutation signal and width determined by the capacitor 146 and the resistor 147. The capacitor 146 may have a value of 1 microfarad, and the resistor 147 has the value of 9 kilohms. With these component values, the output pulse will have a time duration of 0.0031 second, which is one-half the time required for one armature revolution at 10,000 rpm. With two commutation pulses per revolution, the pulse duration is 0.0061 seconds, which is the time for one revolution. Thus, the commutation pulse from one phase will result in a continuous output DC signal from the multivibrator 144 consisting of a series of 0.0031-second pulses attached together in time sequence when the motor speed is 10,000 rpm. This is equivalent to a 100% duty cycle. As the motor slows down, the duty cycle will decrease to, for example, 50% when the motor is running at 5,000 rpm.

The output pulses from the multivibrator 144 (on pin 8) are integrated by a resistor 148 and a capacitor 150. The resultant voltage across capacitor 150 will vary with the frequency or pulse repetition rate of the commutation signal. This linear voltage varies from 0 to 4 volts (for the component values chosen) and is inserted at pin 9 of a pulse generator 152. This pulse generator 152 may be of the type manufactured by Silicon General Corp. Under Part No. 1524B. The output of the pulse generator from pin 14 is a series of pulses with a width which varies with the amplitude of the voltage applied to pin 9. These output pulses are applied as one input to each of the AND gates 120, 122 and 124, as shown. The third input of these AND gates is not shown but would be connected to a positive potential source as was discussed with respect to FIG. 10. The frequency of the output pulses from generator 152 is determined by the values of a resistor 154 and a capacitor 156 connected in series across pins 6 and 7. The frequency of the output pulses should be on the order of ten times the frequency of the commutator pulses at the maximum anticipated motor speed. A current limit control is built into the generator 152 and responds to a voltage across pins 4 and 5 to start limiting the width of the output pulses when the voltage level reaches 200 millivolts. A voltage divider in the form of a pair of resistors 158 and 160 may be connected across the current sensing resistor 67 so that the voltage between the junction 159 of these resistors and ground will be 200 millivolts when the motor current reaches its maximum value. When the motor current exceeds its allowable maximum value, the generator 152 will reduce the width of the output pulses as necessary to return the motor current to its maximum value. The duty cycle of the output pulses from the generator 152 can also be manually controlled by providing a potentiometer and capacitor in series across pins 2 and 16 and removing the lead from pin 9.

Figure 12:
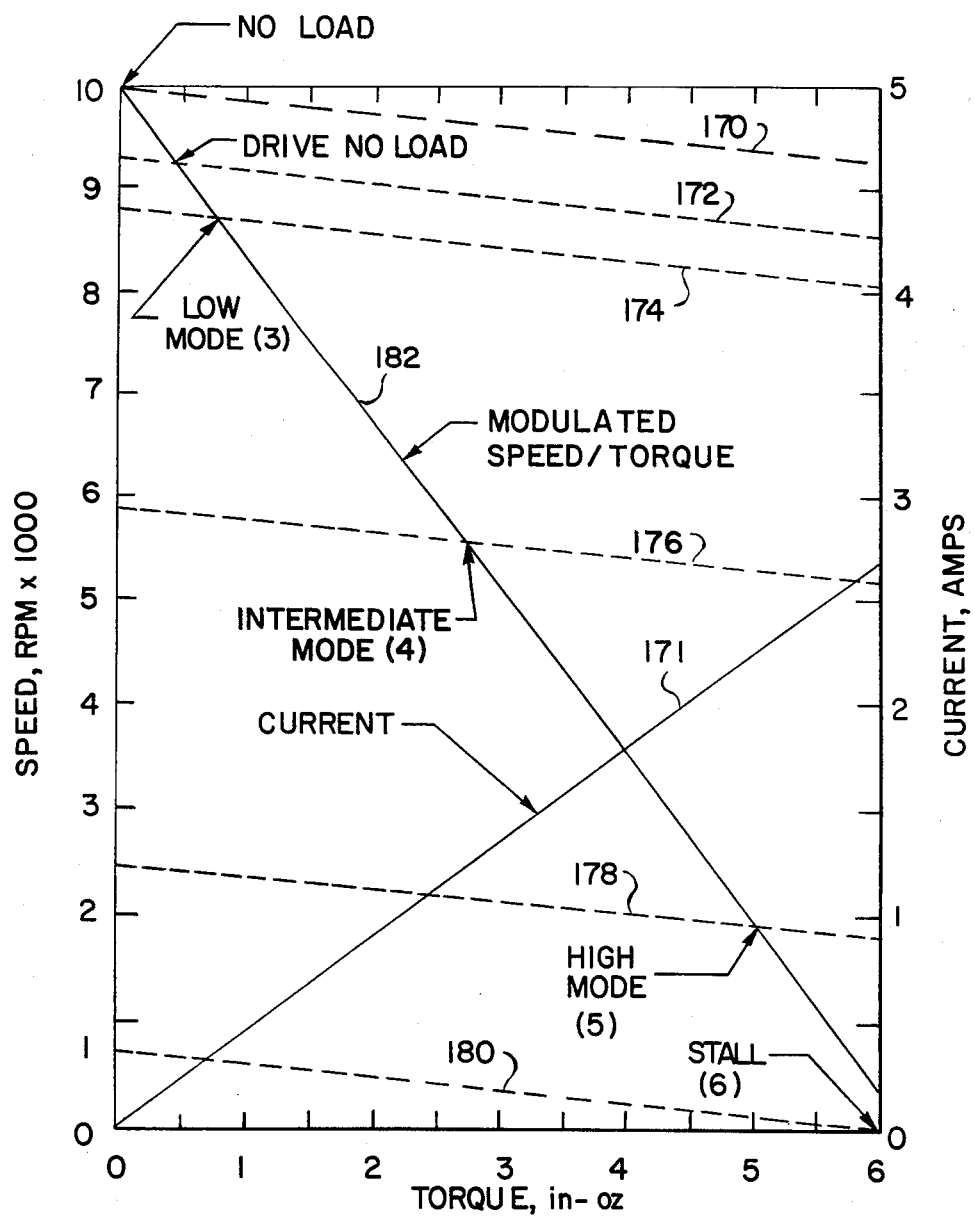
FIG. 12 is a diagram of one speed/torque/current profile of a motor controlled by the system of FIG. 11.

Referring now to FIG. 12, there is illustrated a series of possible speed/torque curves for a brushless DC motor with a maximum no-load speed of 10,000 rpm and a stall torque of 83-inch ounces with full power applied to the windings during each commutation period. See curves 170 and 171 for this operation. Curves 172, 174, 176, 178 and 180 represent the speed/torque curves of the motor where the generator is manually controlled to supply signals of several different duty cycles to the gates 120, 122 and 124. Curve 182 represents the speed torque curve of the motor with the control signals applied to the gates 120, 122 and 124 from the circuit arrangement shown in FIG. 11. As is illustrated, the curve is linear with the minimum current being provided at no load and maximum current being supplied to the motor windings just prior to stall. The following table illustrates the power consumption by the motor at points 1-6 in FIG. 12 under load with a modulated control signal and a nonmodulated control signal.

| Load Condition | Power, Watts | | | |
|---|---|---|---|---|
| | Modulated | | Nonmodulated | |
| | Input | Loss | Input | Loss |
| 1 | 3.0 | 3.0 | 3.0 | 3.0 |
| 2 | 6.3 | 3.2 | 6.8 | 3.7 |
| 3 | 8.2 | 3.3 | 9.3 | 4.4 |
| 4 | 15.2 | 3.8 | 25.8 | 14.4 |
| 5 | 11.2 | 3.8 | 44.8 | 37.4 |
| 6 | 3.9 | 3.9 | 55.4 | 55.4 |

As the above table illustrates, the use of a modulated control signal reduces the power considerably over the power that would be consumed by the motor if the windings were connected to the DC input power during the entire time that the commutation signals are present.

Figure 13:
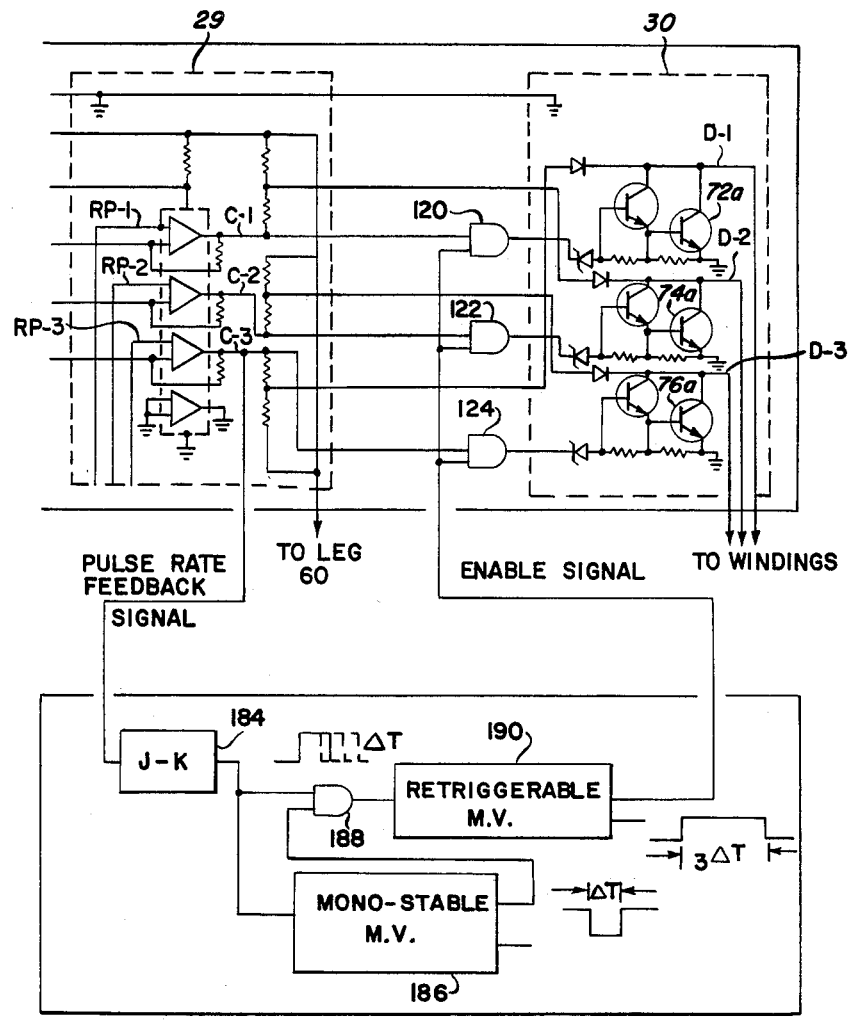
FIG. 13 is a combined block and schematic circuit diagram of another embodiment of the present invention in which the speed of the motor is controlled between two limits.

FIG. 13 illustrates another embodiment of the present invention in which the rate or speed of the motor is controlled within a narrow range by turning off the power to the windings when a maximum speed is reached and turning the power back on when the speed has dropped to a lower value. To provide this type of control, the commutation pulse from phase 3 is applied to the input of a J-K flip-flop 184 which provides an output pulse that spans the leading edges of two positive commutation signals. Thus, the J-K flip-flop produces one output pulse per revolution. The leading edge of the output pulse from the J-K flip-flop triggers a monostable multivibrator 186 which produces a reference pulse having a fixed time duration; i.e., Δt, that is selected to be equal to the duration of the output signal from the J-K flip-flop when the desired motor velocity is reached. The positive output pulse from the J-K flip-flop and the negative reference pulse from the monostable multivibrator 186 are compared in an AND gate 188. The output from the AND gate 188 will be positive when the J-K output pulse has a longer time duration than the output pulse from the monostable multivibrator 186. The AND gate output is used to drive a retrigerable multivibrator 190 which produces a stretched output pulse of approximately three times the time duration of the output from the monostable multivibrator 186. As the motor increases in velocity, the J-K flip-flop positive output pulse duration will decrease in time. When the duration of this pulse is equal to or less than the duration of the fixed reference pulse from the multivibrator 186, the output (trigger) from the AND gate will decrease to zero. With a zero voltage input, the output of the multivibrator 190 will time-out and go to zero. Upon receiving a zero voltage signal from the multivibrator 190 the AND gates 120, 122 and 124 (shown with only two inputs as in FIG. 10) will inhibit the commutation signal and the drive signals to the drive transistors. The stator current will then decrease to zero, causing the motor to decelerate. With a slower motor speed, the J-K output pulse will increase in time and generate an output trigger which, when compared to the reference pulse, will again provide a trigger to the multivibrator 190, allowing the transistor drive signal to turn on the drive transistors and supply current to the stator coils. The motor will accelerate until it reaches its maximum allowable speed as determined by the reference pulse. The system will thus control the motor rate or speed within prescribed limits.

Figure 14:
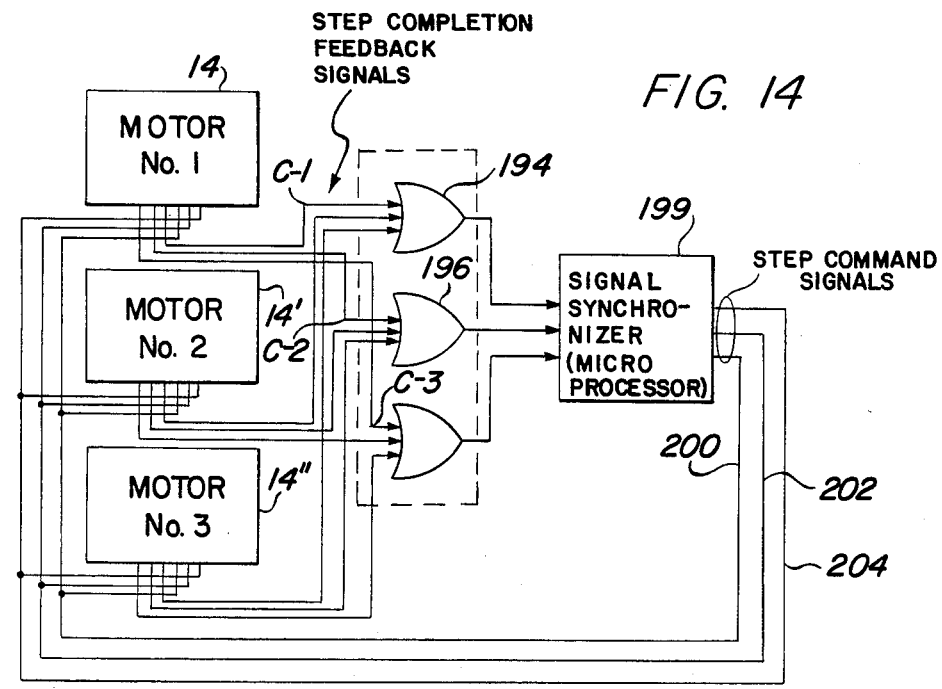
FIG. 14 is a block diagram of another embodiment of the present invention for synchronizing the operation of three motors.
Figure 15:
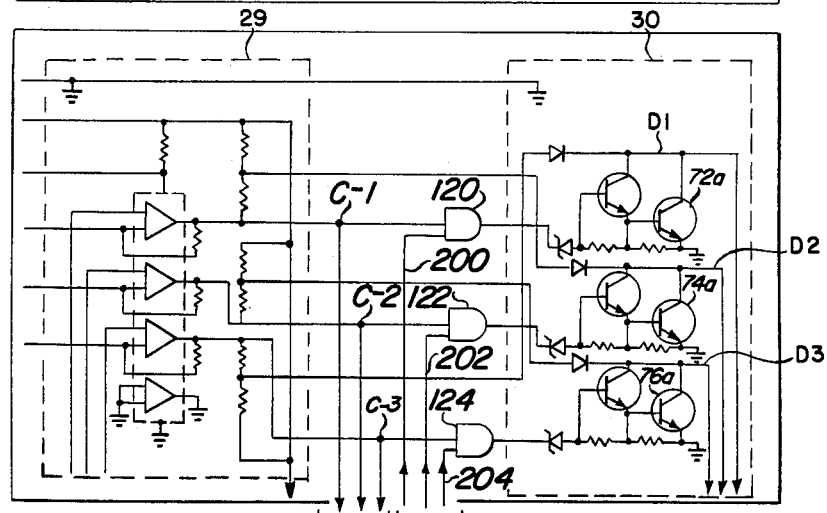
FIG. 15 is a schematic circuit diagram showing the internal connections to the motor circuit for synchronizing a plurality of motors in accordance with the block diagram of FIG. 14.
Figure 16:
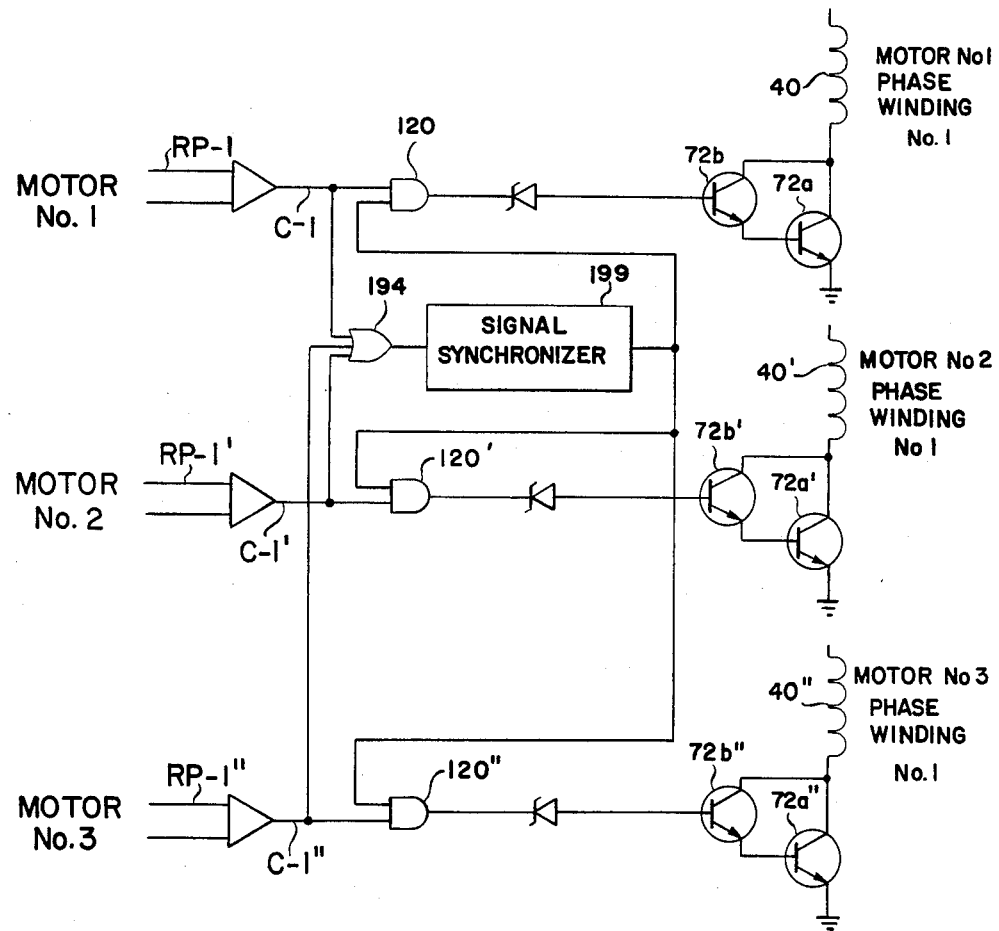
FIG. 16 is a schematic circuit diagram showing one phase winding of three separate motors in accordance with the motor control system of FIGS. 14 and 15.

FIGS. 14, 15 and 16 illustrate another embodiment of the present invention in which the motion of several motors is synchronized. The commutation signals from the phases of each motor are supplied to OR gates 194, 196 and 198. The output of the OR gates is supplied to a signal synchronizer or microprocessor, which in turn produces a step command pulse for each phase of each of the motors. For example, the step command pulses for phase 1 of each of the motors are supplied on lead 200 to the phase 1 AND gate (i.e., 120). The step command pulses for phases 2 and 3 are supplied on leads 202 and 204 to AND gates for phases 2 and 3, respectively.

Referring now to FIG. 15, there is illustrated the control circuitry for one motor used in the synchronizing system of FIG. 14. The leads 200, 202 and 204 are connected to the AND gates 120, 122 and 124 (shown with only two inputs), as discussed above. The commutation signals (referred to in the figure as step completion feedback signals) are illustrated as coming from the terminals C-1, C-2 and C-3.

The AND gates for one phase of each of the three motors of FIG. 14 and the OR gate for that phase are shown in FIG. 16, along with the motor windings 40, 40' and 40" and drive transistors 72a/72b, 72a'/72b' and 72a"/72b" for that phase winding. The shaft position signals for motors 1, 2 and 3 are designated RP-1, RP-1' and RP-1", respectively. The OR gate 194 receives the commutation signals C-1, C-1' and C-1" from phase 1 of each of the motors 1, 2 and 3. The output of the OR gate 194 controls the initiation of the next sequential step command signal which cannot occur until the monitored commutation signals from phase 1 of each of the motors indicate completion of the commutation period. Power will continue to be applied to any motor that has not completed the commanded steps. However, as each individual motor completes the step, its commutation signal will automatically turn off the drive transistor and then shut the power off to the associate phase winding. The motor will then wait for the other units to catch up. This permits the use of independent motors with different output loadings and yet provides for synchronous motion with never more than a single step difference.

There has been described a new and simple system for controlling brushless DC motors which can provide a wide variety of operations in response to low level digital signals directly from signal generator sources such as a computer or microprocessor. Various modifications to the system will be apparent to those skilled in the art without involving a departure from the spirit and scope of the invention. For example, where high inertia loads are to be driven by the motor, dynamic braking may be utilized for removing excess energy. To accomplish such braking additional stator coils may be energized to apply opposing forces. Such techniques are well known to those skilled in the art.

We claim:

1. In an electric motor and control circuit adapted to be energized from a source of direct current, the combination of which comprises:

(a) a brushless DC motor having a multiphase wound stator and a permanent magnet rotor mounted on a shaft and arranged so that each phase winding, when energized from the DC source, will cause the motor to step through a predetermined angular position and so that when all of the phase windings are energized in sequence n times, the rotor will complete one revolution, where n is an integer;

(b) shaft position sensing means for producing shaft position signals indicative of each rotor step required for one complete revolution;

(c) commutation signal-generating means responsive to the shaft position signals for producing commutation signals representative of each rotor step required for one complete revolution;

(d) driving means individually connected between the DC source and each phase winding, each driving means having an input and being arranged to connect the associated winding to the DC source in response to an input signal applied to the input thereof;

(e) gating means individually coupled between the commutation signal-generating means and the input of each driving means, each gating means having an input adapted to receive a control signal for the associated phase winding and being arranged to apply said input signal to the driving means associated with a phase winding only in response to the simultaneous occurrence of the commutation and control signals associated with said phase winding and (f) control signal generating means coupled individually to the input of each gating means for applying independent control signals to selected gating means so that the rotor can be advanced one rotor step at a time.

2. The combination as defined in claim 1 wherein the commutation signal-generating means is further responsive to the energization of the phase windings to prevent overlap between commutation signals.

3. The combination as defined in claim 2 wherein gating means include an AND gate connected between each driving means and the commutation signal-generating means.

4. The combination as defined in claim 3 wherein the motor is three-phase.

5. In a system for controlling a brushless DC motor of the type having a multiphase winding and a rotor mounted on a shaft, the combination which comprises:
(a) shaft position-sensing means for deriving shaft position signals indicative of the angular position of the motor shaft;
(b) commutation signal-generating means responsive to the shaft position signals for generating commutation signals representative of each commutation period for each phase winding;
(c) driving means individually associated with each phase winding for selectively applying current to the associated winding;
(d) control signal-generating means for generating independent control signals for each phase winding; and
(e) gating means individually connected to the driving means for each phase winding and responsive to the commutation and control signals for the respective phase winding for enabling the driving means associated with each phase winding to thereby apply current to the respective winding only upon the occurence of the commutation signal and control signal for said winding, whereby the motor shaft can be incrementally advanced to a selected position.

6. The motor control system of claim 5 wherein the control signal-generating means is arranged to produce separate step command pulses at a controllable repetition rate for each phase winding to control the rate at which the motor shaft advances from one position to another.

7. The motor control system of the claim 6 wherein each step command pulse causes the motor shaft to advance to the next position.

8. The motor control system of claim 7 including address signal-generating means for providing an address signal representative of a predetermined number of commutation signals and position signal-generating means coupled to the commutation signal-generating means for producing a position signal representative of the number of commutation signals generated and wherein the control signal generating means is responsive to the address signal and the position signal and arranged to apply step command pulses to the gating means until the difference between said signals is reduced to zero whereby the shaft will be positioned in accordance with the address signal.

9. The motor control system of claim 8 wherein the position signal-generating means includes an OR gate having an individual input for receiving the commutation signal for each phase winding.

10. The motor control system of claim 9 wherein the control signal generating means is a microprocessor.

11. The motor control system of claim 6 wherein the control signal generating means is arranged to further produce a plurality of torque-regulating pulses for each phase winding during each commutation period, the torque-regulating pulses being arranged to control the total time duration in which each driving means applies current to the associated winding for each commutation period.

12. The motor control system of claim 11 wherein the control signal generating means is arranged to control the duration of the torque-regulating pulses to thereby control the current supplied to the respective phase winding during each commutation period.

13. The motor control system of claim 12 wherein the duration of said torque-regulating pulses is variable within each commutation period.

14. The motor control system of claim 12 wherein the duration of each torque-regulating pulse is short compared to the associated command pulse.

15. The motor control system of claim 11 wherein the time duration that each driving means applies current to the associated winding is controlled by modulating the width of the torque-regulating pulses.

16. The motor control system of claim 6 wherein the shaft position sensing means comprises a target of magnetic material carried by the shaft and a plurality of variable impedance devices positioned adjacent the target, the impedance of the variable impedance devices varying in accordance with the magnitude of the magnetic field impressed thereon, the target being arranged to change the magnetic field impressed of the variable impedance devices during rotation of the motor shaft.

17. The motor control system of claim 16 wherein the variable impedance devices are magnetoresistors.

18. The motor control system of claim 5 wherein the commutation signal-generating means is coupled to each driving means for preventing overlap between the commutation signals.

19. The motor control system of claim 5 wherein each driving means includes a semiconductor switch connected in series with an associated phase winding and a source of direct current.

20. The motor control system of claim 5 wherein the gating means comprises and AND gate connected to each driving means, each AND gate having at least two inputs with one input thereof arranged to receive the commutation signals representative of the commutation period for the respective phase winding and the other input thereof being arranged to receive the control signals for the respective phase winding.

21. In a system for controlling the torque delivered by a brushless DC motor of the type having a multiphase wound stator, a permanent magnet rotor mounted on a shaft and arranged so that each phase winding, when energized, will generate torque for a predetermined number of degrees of shaft rotation, the combination which comprises:
(a) shaft position-sensing means for producing a shaft position signal for each predetermined number of degrees of shaft rotation required to provide a complete rotation of the shaft;
(b) commutation signal-generating means responsive to the shaft position signals for generating commutation signals representative of the commutation time for each phase winding;
(c) torque-regulating signal generating means coupled to the commutation signal-generating means for generating a torque-regulating signal having a repetition rate which is higher than the highest repetition rate of the commutation signals for one phase winding and having a duty cycle which bears a relationship to the repetition rate of the commutation signals for said one phase winding;

(d) driving means individually associated with each phase winding for selectively applying current to the associated winding; and (e) gating means individually connected to the driving means for each phase winding and responsive to commutation signals and the torque-regulating signal for enabling the driving means associated with each phase winding upon the occurrence of the commutation signal for said winding and in accordance with the duty cycle of the torque-regulating signal whereby the instantaneous generated torque is proportional to the instantaneous duty cycle of the torque-regulating signal.

22. The motor control system of claim 21 wherein the torque-regulating signals have a duty cycle which is inversely proportional to the repetition rate of the commutation signals.

23. The motor control system of claim 22 wherein the torque-regulating signal-generating means is responsive to the current flow through the windings and arranged to control the duty cycle of the torque-regulating signals to prevent the current flow from exceeding a maximum allowable value.

24. The motor control system of claim 23 wherein torque-regulating signal-generating means includes:

(a) multivibrator means responsive to commutation signals for one phase winding for producing a train of output pulses having a predetermined width and a frequency proportional to the repetition rate of said commutation signals;

(b) integrating means for producing an output signal representative of the integrated value of the output pulses from the multivibrator means; and (c) pulse-generating means responsive to the output signal from the integrating means for generating a torque-regulating signal having a duty cycle proportional to said output signal.

25. In a system for synchronizing the motion of a plurality of brushless DC motors wherein each motor includes a rotor and a multiphase wound stator with each phase winding being arranged to be energized in succession to provide a rotating magnetic field; a commutation signal generator responsive to the position of the rotor for generating commutation signals representative of commutation time for each phase winding; a driving circuit individually associated with each phase winding for selectively applying current to the associated winding; and a gating circuit individually connected to the driving circuit for each phase winding and responsive to the commutation signals and to an input control signal for enabling the driving circuit associated with each phase winding upon the occurrence of the commutation signal and the input control signal, the combination which comprises:

(a) gating means individually responsive to the commutation signals associated with each respective phase winding of each motor for producing an output signal when each commutation signal for an associated phase winding is completed; and (b) input control signal-generating means for applying said input control signal to the driving circuit associated with the next succeeding phase winding to be energized in response to an output signal from the gating means.

26. The motor control system of claim 25 wherein motion of three motors is to be synchronized and each motor includes first, second and third phase windings.

27. The motor control system of claim 26 wherein the gating means comprises an OR gate individually associated with each of the three phase windings, each OR gate having three inputs with each input being arranged to receive the commutation signal for the associated phase winding from each motor.

* * * * *